UNITED STATES PATENT OFFICE.

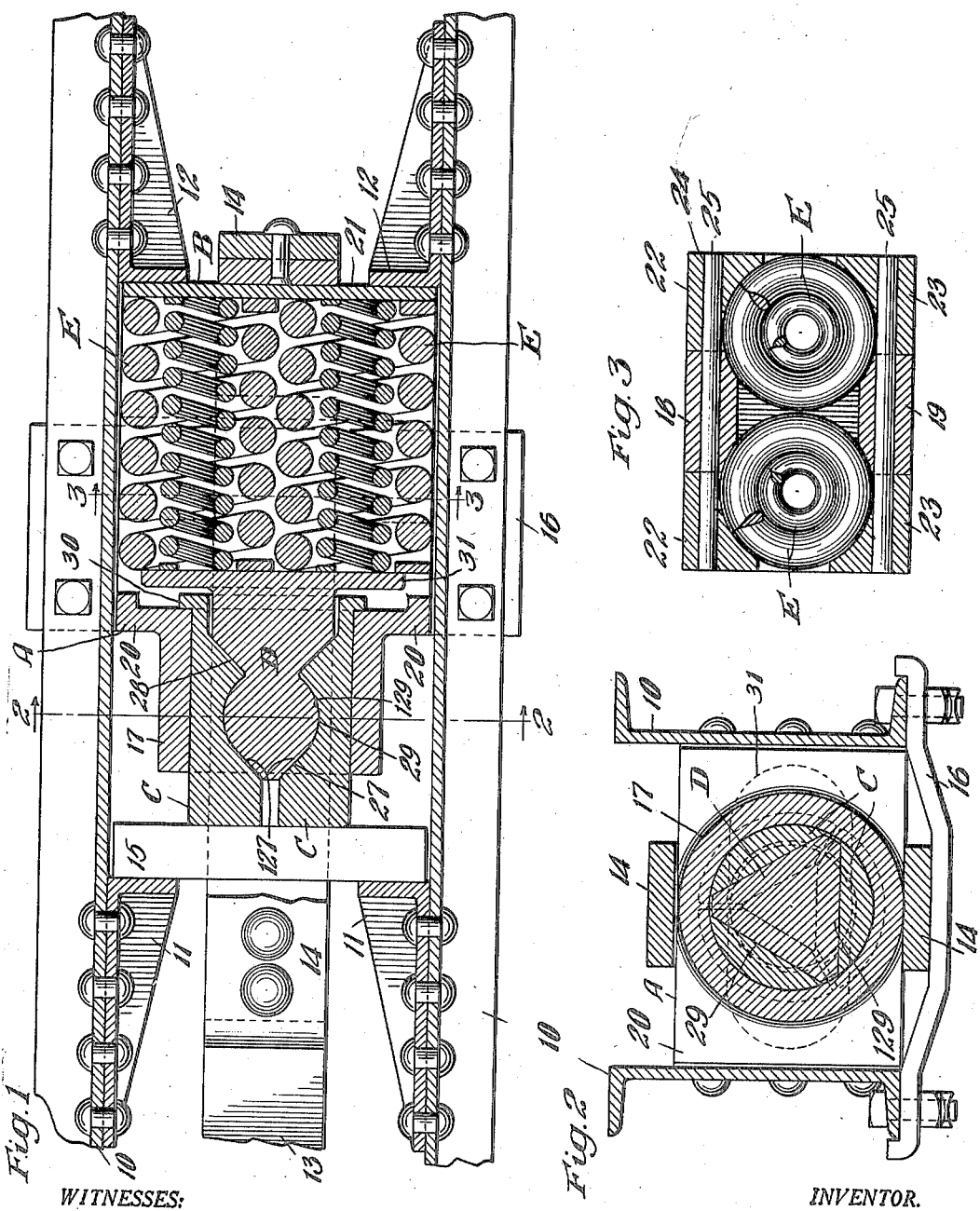

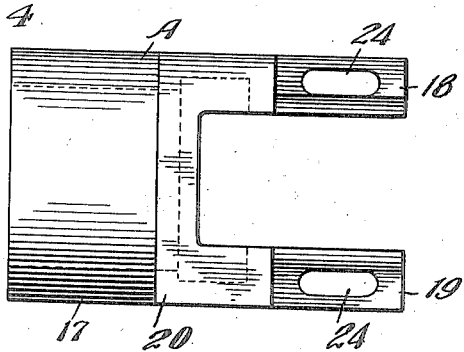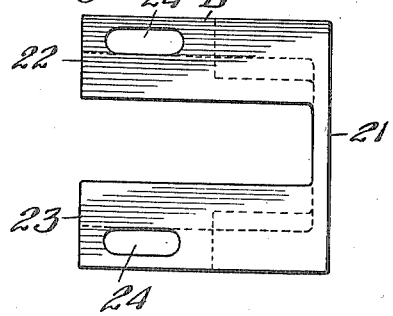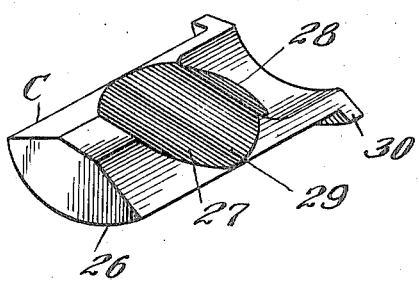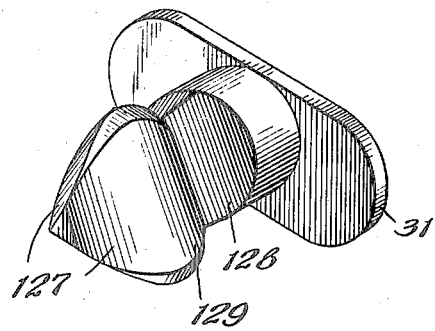

JOHN F. O'CONNOR, OF CHICAGO, ILLINOIS, ASSIGNOR TO WILLIAM H. MINER, OF CHAZY, NEW YORK.

SHOCK-ABSORBING MECHANISM.

1,303,380. Specification of Letters Patent. Patented May 13, 1919.

Application filed July 13, 1918. Serial No. 244,754.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbing Mechanism, of which the following is a full, clear, concise, and exact description, reference being had to the accompanying drawings, forming a part of this specification.

This invention relates to improvements in shock absorbing mechanism.

One object of the invention is to provide a spring gear for railway draft riggings which is provided with a friction dampener to overcome recoil.

In the drawing forming a part of this specification, Figure 1 is a horizontal, sectional view of a portion of a railway draft rigging showing my improvements in connection therewith. Figs. 2 and 3 are vertical, transverse, sectional views, taken on the lines 2—2 and 3—3, respectively, of Fig. 1. Figs. 4 and 5 are side elevational views of the two elements or parts used to constitute the spring cage or casing. Figs. 6 and 7 are detail, perspective views of one of the friction shoes and the wedge, respectively, embodied in the spring dampening device.

In said drawing, 10—10 denote channel draft sills of a railway car to the inner faces of which are secured front and rear stop lugs 11 and 12. The draw bar 13 is operatively connected with the shock absorbing mechanism proper by any suitable means such as the strap yoke 14 which encircles the shock absorbing mechanism and the front follower 15. The parts are supported as by a saddle plate 16.

The shock absorbing mechanism proper, as shown, comprises a two-part combined friction shell and spring casing formed of two members A and B; a plurality of friction shoes C—C; a wedge or spreader D; and twin springs E—E.

The combined shell and casing, as heretofore indicated, is formed by the members A and B. The member A, as clearly shown in Fig. 4, embodies a cylindrical friction shell 17 formed integrally with a pair of upper and lower rearwardly extended centrally disposed arms 18 and 19. As shown in Fig. 1, the member A is laterally extended as indicated at 20—20 to a width corresponding to the usual width or spacing between draft sills. The member B, as shown in Fig. 5, is of substantially U-shape and includes a rear wall 21 and two sets of upper and lower arms 22 and 23, as indicated in Fig. 3, that are adapted to straddle the centrally disposed arms 18 of the member A. The arms 18, 19, 22 and 23 are provided with suitable slots 24 that are adapted to be brought into alinement when the two members A and B are assembled and to receive transversely extending connecting keys 25—25 as shown in Fig. 3. As will be understood, the rear wall 21 of the member B acts as a rear follower for the shock absorbing mechanism and coöperates with the rear stops 12—12.

Coöperable with the friction shell 17 are the friction shoes C of which three are preferably used. The shoes C are circularly arranged and each has an exterior cylindrical friction surface 26, a pair of interior, spaced, substantially parallel blunt wedging surfaces 27 and 28, an intermediate curved surface 29, and a laterally outwardly extended flange 30. The flange 30 normally engages the inner end of the friction shell 17 as clearly shown in Fig. 1 and limits the outward movement of the friction shoes with respect to the shell.

The wedge or spreader D is formed with a head having three wedge faces 127—127 coöperable with the wedge faces 27 of the shoes; rounded portions 129—129 corresponding to the curved surfaces 29 of the shoes; three additional wedge surfaces 128—128 coöperable with the wedge surfaces 28 of the shoes; and an integral follower plate 31 at its rear end coöperable with the twin arranged springs E—E. It will be noted that the spreader D and the friction shoes are interlocked when assembled within the friction shell because of the enlarged head on the spreader although there is, of course, the permissible wedging or spreading action between the elements.

Each of the springs E preferably consists of an outer heavy coil and an inner nested coil in accordance with the usual construction.

In assembling my improved shock absorbing mechanism, the friction elements hereinbefore described, are mounted within the friction shell 17 and the two parts of the casing A and B are then applied over the springs E. The parts thus assembled are then placed under compression in any suitable manner, as for instance, in a "bulldozer" or "static machine" and the two members A and B brought together to aline the slots 24 so as to receive the keys 25.

It will be noted that the spreader member is acted upon directly by the springs and external pressure is applied to the friction shoes, the reverse of the usual friction gear arrangement. The reason for this is to insure generation of friction during the release stroke since the tendency will be to spread the friction shoes outwardly as the release pressure from the springs is applied directly to the wedge. It will be evident that friction is generated in both directions.

Although I have herein shown and described what I now consider the preferred manner of carrying out my invention, the same is employed in a descriptive manner and not in a limiting sense, and I contemplate all changes and modifications that come within the scope of the claim appended hereto.

I claim:

In a shock absorbing mechanism of the character described, the combination with a friction shell having interior shoulders, of friction shoes coöperable therewith, said shoes having shoulders at their ends coöperable with the shoulders of the shell to limit the outward movement of the shoes with respect to the shell, a spreader coöperable with said shoes and interlocked therewith when the parts are assembled within the shell, and spring means for resisting relative movement between the shell and said shoes and spreader, the spreader and shoes in interlocked relation being insertible within the shell from its inner end.

In witness that I claim the foregoing I have hereunto subscribed my name this 10th day of July, 1918.

JOHN F. O'CONNOR.

Witness:
JOSEPH HARRIS.